Plate 1. J. V. Woolsey's Cutter-Head

No. 117850

Patented Aug. 8 1871

Witnesses:
R. V. Campbell
J. N. Campbell

Inventor:
J. V. Woolsey
by
Mason, Fenwick & Lawrence

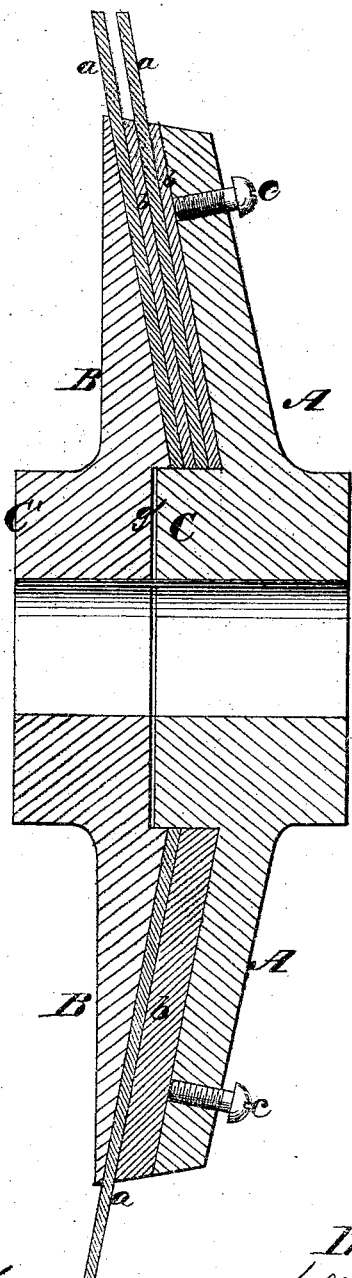

UNITED STATES PATENT OFFICE.

JOHNSTON V. WOOLSEY, OF SANDUSKY, OHIO.

IMPROVEMENT IN CUTTER-HEADS.

Specification forming part of Letters Patent No. 117,850, dated August 8, 1871.

*To all whom it may concern:*

Be it known that I, JOHNSTON V. WOOLSEY, of Sandusky, in the county of Erie and State of Ohio, have invented a new and Improved Cutter-Head; and I do hereby declare that the following is a full, clear, and exact description thereof, reference being had to the accompanying drawing making part of this specification, in which—

Figure 1:
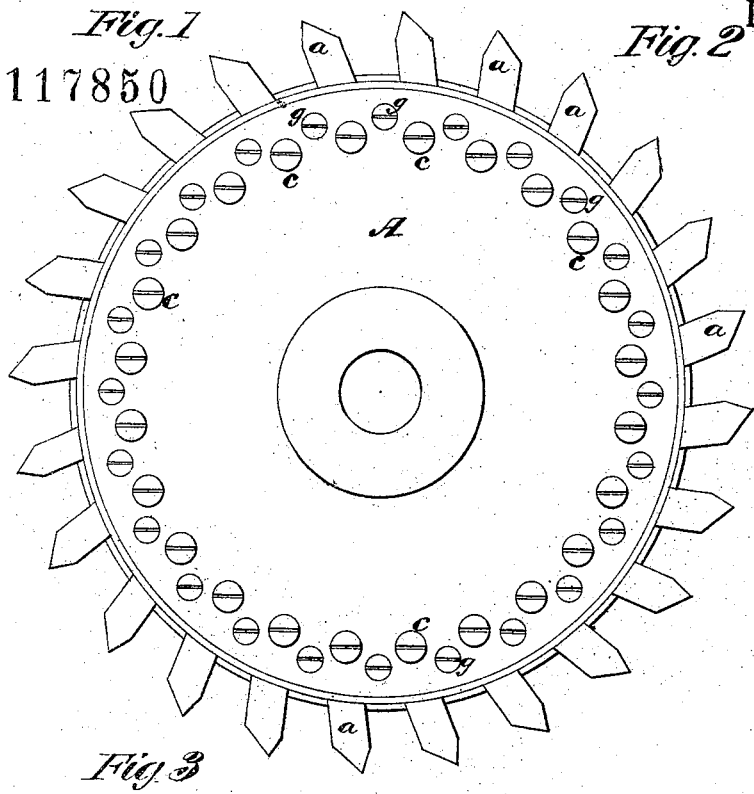
Figure 2:
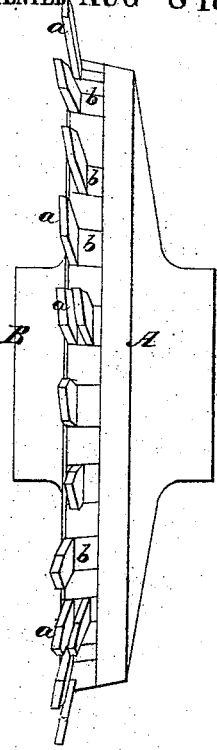
Figure 3:
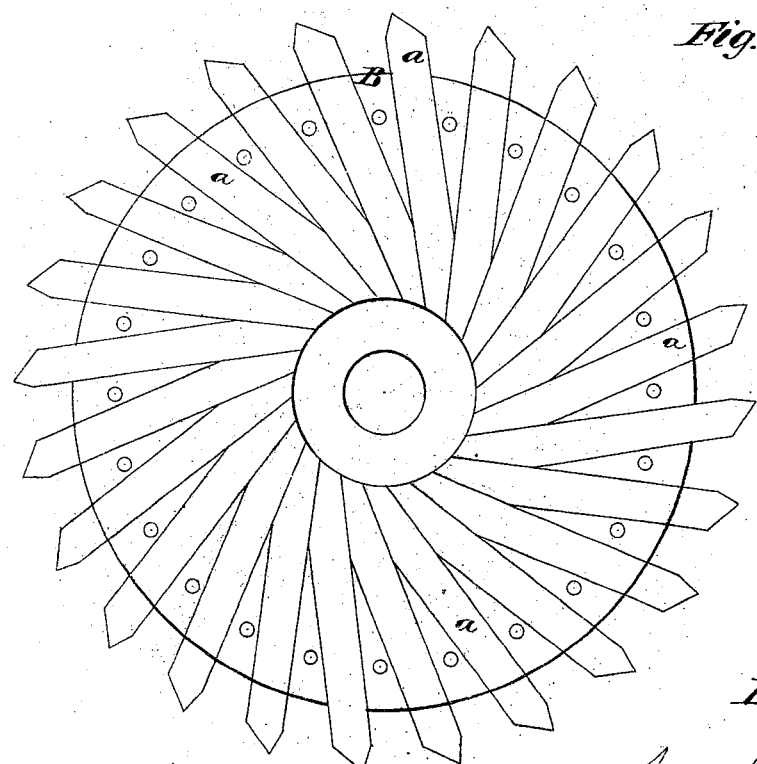
Figure 4:
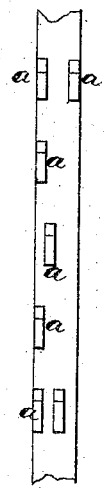

Figure 1, plate 1, is a view of one side of the cutter-head. Fig. 2, plate 1, is an edge view of the same. Fig. 3, plate 1, shows the manner of arranging the cutters in the head. Fig. 4, plate 1, shows an arrangement of cutters for cutting the full width of the head. Fig. 5, plate 2, is a diametrical section of the head.

Similar letters of reference indicate corresponding parts in the several figures.

This invention relates to cutter-heads which are designed for use in machinery for turning irregular forms. The objects of the invention are to construct a rotary cutter-head in such manner that the cutters shall stand oblique and also tangential to the axis of the arbor, and shall be adjustable radially, and also removable, as will be hereinafter explained.

The following explanation of my cutter-head will enable others skilled in the art to understand it:

In the accompanying drawing, A B represent two circular plates, which are constructed with hubs C C', and adapted to receive between them the cutters $a$. The plate B has one convex side, which is tangentially grooved to receive the cutters $a$ and filling-pieces or stocks $b$. Fig. 3 shows the tangential arrangement of the grooves and their cutters, which gives the required degree of pitch to the latter. Figs. 2 and 5 show the obliquity or inclined positions of the grooves and cutters, which give a continued set to the latter. The center of the convex or grooved surface of the plate B is depressed, as at $g'$, Fig. 5, for receiving an extension of the hub of plate A, which extension affords an abutment for the axial ends of all the stocks. The inner surface of the plate A is concave, and is adapted to fit snugly in contact with the convex or grooved surface of the plate B, as shown in Fig. 5. The two plates A B are confined rigidly together by means of screws or bolts $g$, which pass through the plate A and are tapped into the plate B between the grooves therein. Between these screws or bolts $g$, and a little nearer the axis of the cutter-head, screws $c$ are tapped through the plate A, and when set up tightly against their respective cutter-stocks or cutters will confine them rigidly in their places. By loosening the screws $c$ the cutters can be adjusted endwise, or removed from the cutter-head for sharpening, or for any other purpose.

By my invention it will be seen that the cutters can be spaced laterally according to the width of cut required, and that the movable spacing-pieces or stocks allow one cutter to be arranged out of line with respect to other cutters, as indicated in Fig. 4, so that the wood will be gradually reduced by the cutters acting at different times for a given width of cut, thereby preventing sudden shocks to the arbor and causing the machine to work regularly and smoothly. It will also be seen that the cutter-head is so constructed as to allow the cutters to be adjusted to compensate for the wearing away of their edges without changing the degree of pitch or set.

Having described my invention, what I claim as new, and desire to secure by Letters Patent, is—

1. The cutter-head A B, one plate of which is obliquely and tangentially grooved to receive the cutters, in combination with the set-screws $c$, substantially as described.

2. The spacing-pieces $b$ and cutters $a$, combined with a cutter-head which is constructed substantially as described.

JOHNSTON V. WOOLSEY.

Witnesses:
S. C. WHEELER,
C. H. HUBBARD.